(12) United States Patent
Yoon (10) Patent No.: US 7,106,755 B2
(45) Date of Patent: Sep. 12, 2006

(54) PROTOCOL INTEGRATING APPARATUS AND METHOD FOR TELECOMMUNICATIONS

(75) Inventor: Seong Jun Yoon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 854 days.

(21) Appl. No.: 09/893,459

(22) Filed: Jun. 29, 2001

(65) Prior Publication Data

US 2002/0001318 A1   Jan. 3, 2002

(30) Foreign Application Priority Data

Jun. 29, 2000   (KR) .............................. 2000-36576

(51) Int. Cl.
  *H04J 3/16*  (2006.01)
  *H04J 3/24*  (2006.01)
(52) U.S. Cl. ...................... 370/467; 370/469; 370/524; 370/395.1
(58) Field of Classification Search ................. 370/264
  See application file for complete search history.

(56) References Cited

U.S. PATENT DOCUMENTS 5,138,614 A * 8/1992 Baumgartner et al. ...... 370/261
5,390,175 A * 2/1995 Hiller et al. ................. 370/398
6,081,525 A * 6/2000 Christie et al. ............. 370/392
6,456,629 B1 * 9/2002 Bjorkqvist et al. ......... 370/466

* cited by examiner

*Primary Examiner*—Chau Nguyen
*Assistant Examiner*—Cynthia L. Davis
(74) *Attorney, Agent, or Firm*—Fleshner & Kim, LLP

(57) ABSTRACT

An MTP L3 protocol integrating apparatus of a signaling system No.7 or other telecommunications network includes: a narrowband-ISDN user part (N-ISUP) network; a broadband-ISDN user part (B-ISUP) network; and a protocol integrating unit receiving a predetermined message from a lower layer and simultaneously interfacing the corresponding message to the N-ISUP network and the B-ISUP network according to a protocol type of the received message. The N-ISDN protocol and the B-ISDN protocol are all received by a single unit and selectively operated according to a user's instruction, so that the N-ISUP network and the B-ISUP network can be simultaneously interfaced. In addition, rather than replacing the ISDN protocol itself as in the background art, the MTP L2 or AAL are replaced, so that the presently used ISDN protocol can be easily modified as the occasion demands.

26 Claims, 7 Drawing Sheets

PROTOCOL INTEGRATING APPARATUS AND METHOD FOR TELECOMMUNICATIONS

BACKGROUND OF THE INVENTION

1. Field of the Invention

The invention relates to telecommunications, and more particularly, to a protocol integrating apparatus and method.

2. Background of the Related Art

Generally, a Signaling System No.7 (SS7) is a common signaling system in which the speech line and the signal channel are separated, and where a plurality of voice signals are transmitted and received through an independent signal channel.

Figure 1:
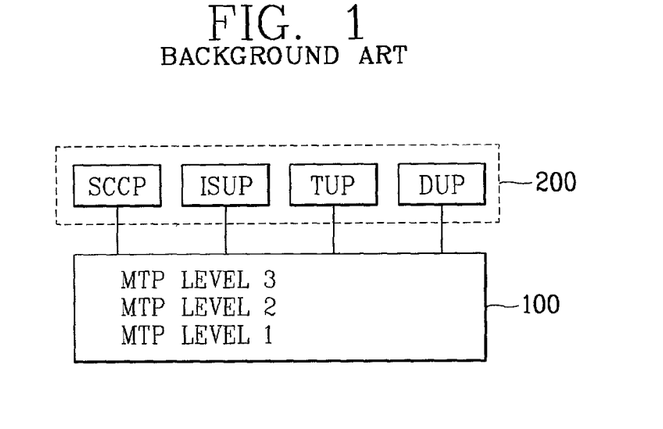
FIG. 1 is a drawing illustrating a related art hierarchical protocol structure of a general signaling system No.7.

FIG. 1 is a drawing illustrating a hierarchical protocol structure of the signaling system No.7. The signaling system No.7 includes a message transfer part (MTP) 100 for transferring a message to a destination and an MTP user unit 200 using the MTP 100. The MTP 100 includes three levels (MTP level 1- MTP level 3), and the MTP user unit 200 includes a Signaling Connection Control Part (SCCP), an Integrated Digital Services Network (ISDN), User Part (ISUP), a Telephone User Part (TUP) and a Data User Part (DUP) according to service characteristics.

The ISDN User Part (ISUP) provides the protocol's necessary to set-up, manage, and release trunk circuits that carry voice and data over narrow band-ISDN (N-ISUP) or broad band-ISDN (B-ISUP) services. MPT level 3 (MTP L3) distributes messages based on point code information contained in a routing label.

Figure 2:
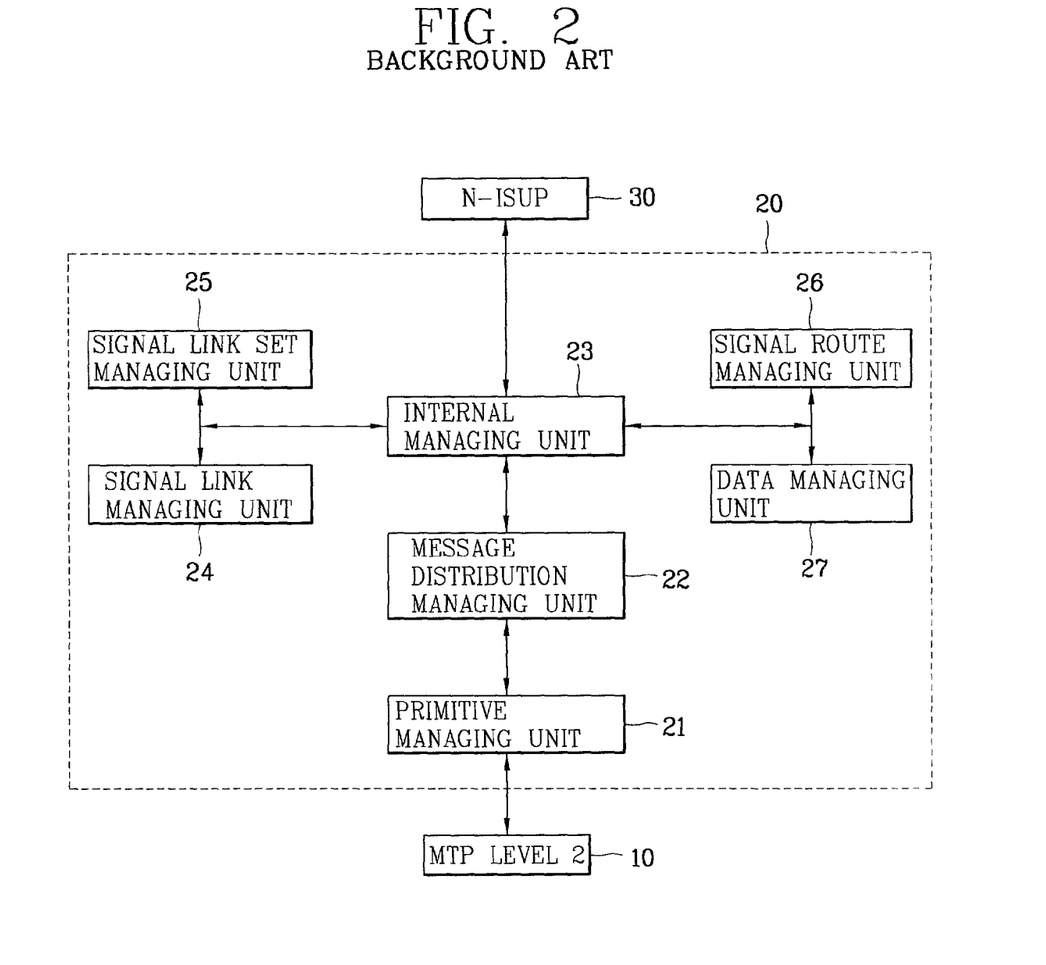
FIG. 2 is a drawing illustrating an MTP L3 protocol structure of the related art signaling system No.7 for interfacing an N-ISUP network.

FIG. 2 is a drawing illustrating an MTP L3 protocol structure 20 of the signaling system No.7 for interfacing the N-ISUP network. A primitive managing unit 21 determines whether a message inputted from the MTP level 2 10 (a lower layer) is an N-ISUP message. If the received message is the N-ISUP, the primitive managing unit 21 determines whether the corresponding N-ISUP message is an originating message or a destination message.

A message distribution managing unit 22 transmits the N-ISUP message received from the primitive managing unit 21 to the MTP user unit (not shown) through a signal link and a signal route. An internal managing unit 23 activates a signal link managing unit 24, a signal link set managing unit 25, a signal route managing unit 26 and a data managing unit 27 and makes connection to a destination point code associated with N-ISUP 30, according to a prior user instruction.

The signal link managing unit 24 activates a signal link of the N-ISUP and restores the signal link under the control of the internal managing unit 23. The signal link set managing unit 25 activates a signal set of the N-ISUP and controls signal link availability, performs a link related measurement, monitors link set state, and restores a link as necessary, under the control of the internal managing unit 23. The signal route managing unit 26 activates a signal route of the N-ISUP, manages and controls a signal link state (availability and nonavailability), and performs functions for maintaining a traffic transmission performance of the signal network such as updating a link state with occurrence of failure of the link or to manage prohibition. The data managing unit 27 stores user data, such as, the originating point code and a destination point code of the N-ISUP, inputted through a user interface managing unit (not shown), analyzes the user instruction to perform a corresponding instruction, and then informs an operation and maintenance (OAM) part of the result.

In operation of the MTP L3 protocol 20, a user registers user data, such as, the originating point code, a destination point code, a signal link, a signal link set, and a signal route related to the N-ISUP network 30 in the data managing unit 27 through a user interface (not shown). After the user data is completely registered, the user inputs a control instruction to the internal managing unit 23 to access the destination point code associated with the N-ISUP 30. Next, the internal managing unit 23 determines whether the signal link currently intended to be activated by the user is the N-ISUP on the basis of the control instruction and the data stored in the data managing unit 27.

If the signal link to be activated is the N-ISUP, the internal managing unit 23 controls the signal link managing unit 24, the signal link set managing unit 25 and the signal route managing unit 26 in turn to activate the signal link, the signal link set and the signal route. Accordingly, the MTP L3 protocol 20 transmits and receives a message to and from the destination point code of the N-ISUP 30 through the activated signal link, the signal link set and the signal route.

In a state that the signal link, the signal link set and the signal route are activated, when the primitive managing unit 21 receives a certain message from the MTP level 2 10, it compares the originating point code and destination point code included in the received message to the originating point code and destination point code stored in data managing unit 27 and determines whether the received message is the N-ISUP message.

If the received message is the N-ISUP message, the primitive managing unit 21 searches field information of the N-ISUP message and determines whether the corresponding N-ISUP message is an originating message or a destination message. If the N-ISUP message is the originating message, the primitive managing unit 21 outputs the corresponding N-ISUP message to the message distribution managing unit 22. If the N-ISUP message is the destination message, the primitive managing unit 21 routes the N-ISUP message to the corresponding destination point.

The message distribution managing unit 22 analyzes field information of the N-ISUP inputted from the primitive managing unit 21 and determines whether the N-ISUP message is a user message or an administrative message. If the N-ISUP message is a user message, the message distribution managing unit 22 directly transmits the N-ISUP message through the activated signal link, the signal link set and a signal route to the Destination Point Code (DPC) of the N-ISUP 30. If, however, the N-ISUP message is an administrative message, the message distribution managing unit 22 outputs the received N-ISUP administrative message to the internal managing unit 23. Then, the internal managing unit 23 manages the state of the signal link, the signal link set and the signal route according to the administrative message.

Figure 3:
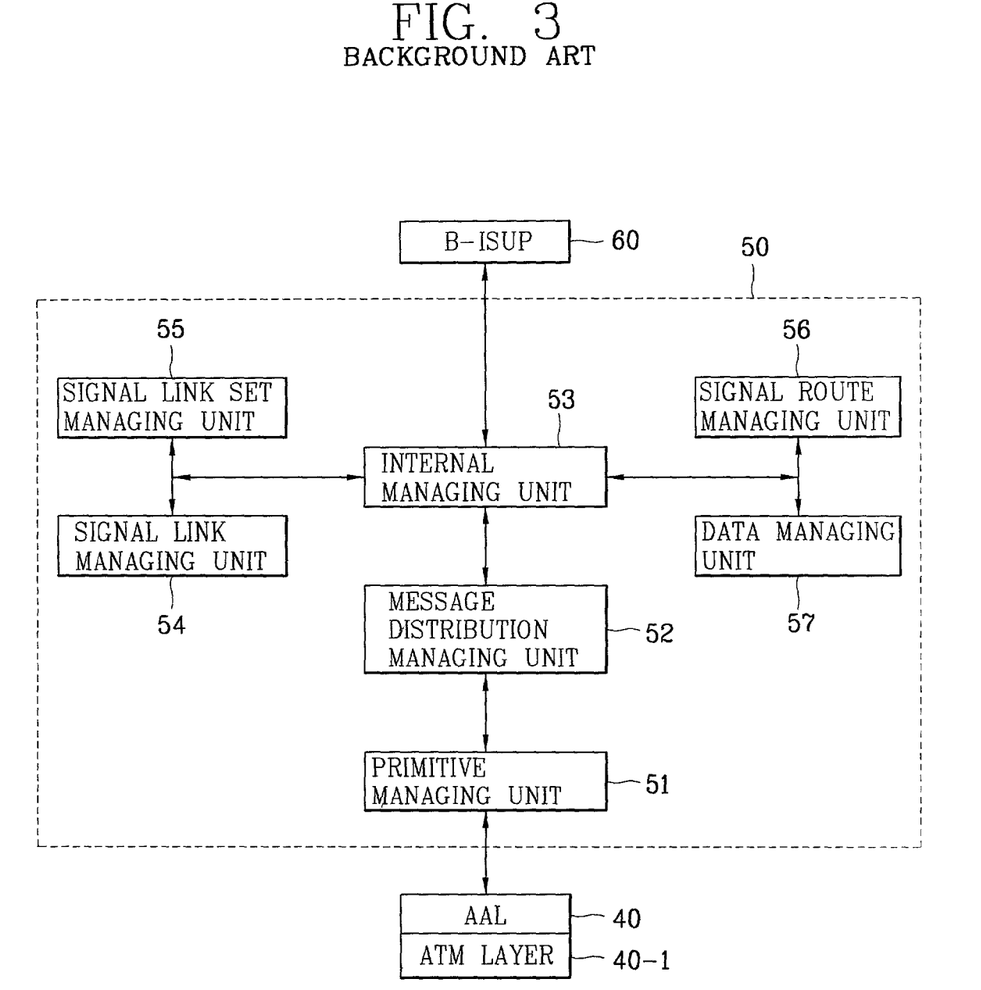
FIG. 3 is a drawing illustrating an MTP L3 protocol structure of the related art signaling system No.7 for interfacing a B-ISUP network.

FIG. 3 is a drawing illustrating an MTP L3 protocol 50 structure of the signaling system No. 7 for interfacing a B-ISUP network. The MTP L3 protocol 50 has the same structure as that of the MTP L3 protocol 20 as shown in FIG. 2, except that it interfaces a B-ISUP message instead of the N-ISUP message. The user registers the originating point code, a destination point code, a signal link a signal link set and a signal route related to the B-ISUP network in the data managing unit 57 through a user interface (not shown). After the user data is completely registered, the user inputs a control instruction to the internal managing unit 53 to sequentially activate the signal link, the signal link set and the signal route of the B-ISUP.

In this state, when the primitive managing unit 51 receives a predetermined message from an Asynchronous Transfer Mode (ATM) adaptation layer (AAL) 40 (a lower layer of the protocol), the primitive managing unit 51 determines whether the received message is a B-ISUP message. If the received message is the B-ISUP message, the primitive managing unit 51 searches field information of the B-ISUP message and determines whether the corresponding B-ISUP message is the originating message or the destination message. If the B-ISUP message is the originating message, the primitive managing unit 51 outputs the corresponding B-ISUP message to the message distribution managing unit 52. If, however, the B-ISUP message is a destination message, the primitive managing unit 51 routes it to a corresponding destination point.

The message distribution managing unit 52 analyzes field information of the B-ISUP message inputted from the primitive managing unit 51 and determines whether the B-ISUP message is a user message or an administrative message. If the B-ISUP message is a user message, the message distribution managing unit 52 directly transmits the B-ISUP message through the activated signal link, the signal link set and the signal route to a destination signal point of the B-ISUP 60. If, however, the B-ISUP message is determined to be an administrative message, the message distribution managing unit 52 outputs the received B-ISUP administrative message to the internal managing unit 53, so that the internal managing unit 53 manages the state of the signal link, the signal link set and the signal route according to the administrative message.

In the conventional signaling system No.7, described above, the MTP level 3 protocol is independently implemented depending on a type of the ISDN network to be received by the signaling system No.7. Thus, a problem arises that the MTP L3 protocol structure of the conventional signaling system No.7 must implement separate protocol structures to interface N-ISUP and B-ISUP signaling.

In addition, where an N-ISUP network is replaced with a B-ISUP network, both MTP level 3 and MTP level 2 must be replaced increasing the complexity of network upgrade.

SUMMARY OF THE INVENTION

In order to solve at least the above problems, an object of the invention is to provide an MTP L3 protocol integrating apparatus that is capable of simultaneously interfacing an N-ISUP network and a B-ISUP network, and a method for using the protocol integrating apparatus.

Another object of the invention is to provide an MTP L3 protocol integrating apparatus that is capable of easily changing operation of a N-ISUP network and a B-ISUP network even while a system is being operated, and a method for using the protocol integrating apparatus in this way.

To achieve at least the above objects in whole or in part, there is provided message transfer part level 3 protocol integrating apparatus of a network including, at least: a narrowband-ISDN user part (N-ISUP) network; a broadband-ISDN user part (B-ISUP) network; and a protocol integrating unit receiving a predetermined message from a lower layer of protocol and simultaneously interfacing the corresponding message to the N-ISUP network and the B-ISUP network according to a protocol type of the predetermined message.

To achieve at least these advantages in whole or in part, there is further provided a message transfer part level 3 L3 protocol integrating apparatus of a network including, at least: a data managing unit storing a user data related to a N-ISUP and B-ISUP network; a signal link managing unit managing a signal link of the N-ISUP and B-ISUP network; a signal link set managing unit managing a signal link set of the N-ISUP and the B-ISUP network; a signal route managing unit managing a signal route of the N-ISUP and the B-ISUP network; an internal managing unit controlling the signal link managing unit, the signal link set managing unit and the signal route managing unit and activating the N-ISUP network or the B-ISUP network; a primitive managing unit for determining whether a received message is an N-ISUP or a B-ISUP message; and a message distribution managing unit transmitting an originating N-ISUP or B-ISUP message from the primitive managing unit through the activated N-ISUP network or the B-ISUP network to an ISDN user part.

To achieve at least these advantages in whole or in part, there is further provided an MTP L3 protocol integrating method of a network including at least the steps of: registering user data related to a N-ISUP or B-ISUP message; activating the N-ISUP network or the B-ISUP network according to a user control instruction and the registered user data; determining a type of a received message; and transmitting a corresponding message through the activated N-ISUP network or the B-ISUP network to the ISDN user part.

To achieve at least these advantages in whole or in part, there is further provided an MTP L3 protocol integrating method of a network including at least the steps of: registering user data related to a N-ISUP and B-ISUP message; activating the N-ISUP network or the B-ISUP network according to a user control instruction and the registered user data; determining a type of a received message; and transmitting a corresponding message through the activated N-ISUP network or the B-ISUP network to the ISDN user part.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
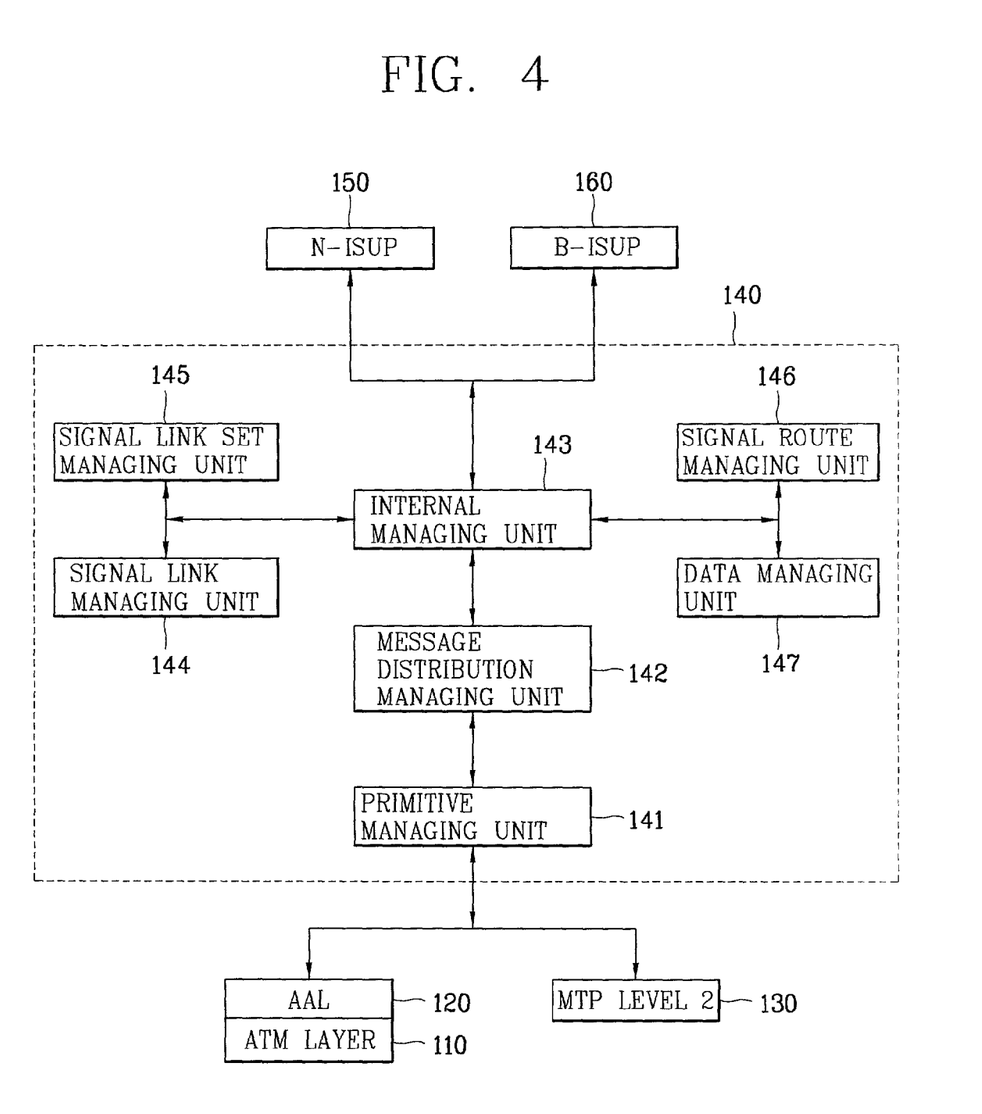
FIG. 4 is a drawing illustrating a structure of an MTP L3 protocol integrating apparatus of a telecommunications network in accordance with a preferred embodiment of the invention.

The invention is directed to an MTP L3 protocol integrating apparatus of a telecommunication network, such as a signaling system No.7, to simultaneously interface to a first network (N-ISUP) 150 and second network (B-ISUP) 160.

FIG. 4 is a drawing illustrating a structure of an MTP L3 protocol integrating apparatus of a telecommunications network in accordance with a preferred embodiment of the present invention. In an MPT L3 protocol integrating apparatus in accordance with a preferred embodiment of the invention, a primitive managing unit 141 of a protocol integrating unit 140 may determine whether a message received from a lower layer of the protocol is an N-ISUP message outputted from an MTP level 2 130 or a B-ISUP message outputted from an Asynchronous Transfer Mode (ATM) Adaption Layers (AAL) 120. In addition, the primitive managing unit 141 may determine whether the received message is an originating message or a destination message.

A message distribution managing unit 142 may transmit the N-ISUP message or the B-ISUP message received from the primitive managing unit 141 to the MTP user unit (an upper layer of the protocol) through a signal link and a signal route of an N-ISUP network or a B-ISUP network.

An internal managing unit 143 may activate a signal link managing unit 144, a signal link set managing unit 145, a signal route managing unit 146 and a data managing unit 147 and make an access state with respect to a Destination Point Code (DPC) associated with an N-ISUP 150 or the B-ISUP 160, according to a user instruction.

The signal link managing unit 144 may manage all the signal links of the N-ISUP and the B-ISUP, and activate a signal link of the N-ISUP and restore the signal link under the control of the internal managing unit 143.

The signal link set managing unit 145 may manage all the signal links of the N-ISUP and the B-ISUP, activate a signal set of the N-ISUP and the B-ISUP, control signal link availability, perform a link related measurement, monitor a link set state, and restore a link, under the control of the internal managing unit 143.

The signal route managing unit 146 may manage all the signal links of the N-ISUP and the B-ISUP, activate a signal route of the N-ISUP and the B-ISUP, manage and control a signal link state (availability and nonavailability), and perform functions for maintaining transmission performance of the signal network such as updating a link state in the event of failure of the link or to manage prohibition.

The data managing unit 147 may store user data such as the originating point code of the N-ISUP 150 and the B-ISUP 160 and a destination point code of the N-ISUP and the B-ISUP, inputted through a user interface managing unit (not shown). Data managing unit 147 may also analyze the user instruction to perform a corresponding instruction and inform an operation and maintenance (OAM) part of the result.

The operation of the MTP L3 protocol integrating apparatus of the telecommunications network constructed as described above will now be explained with reference to the accompanying drawings.

Figure 5:
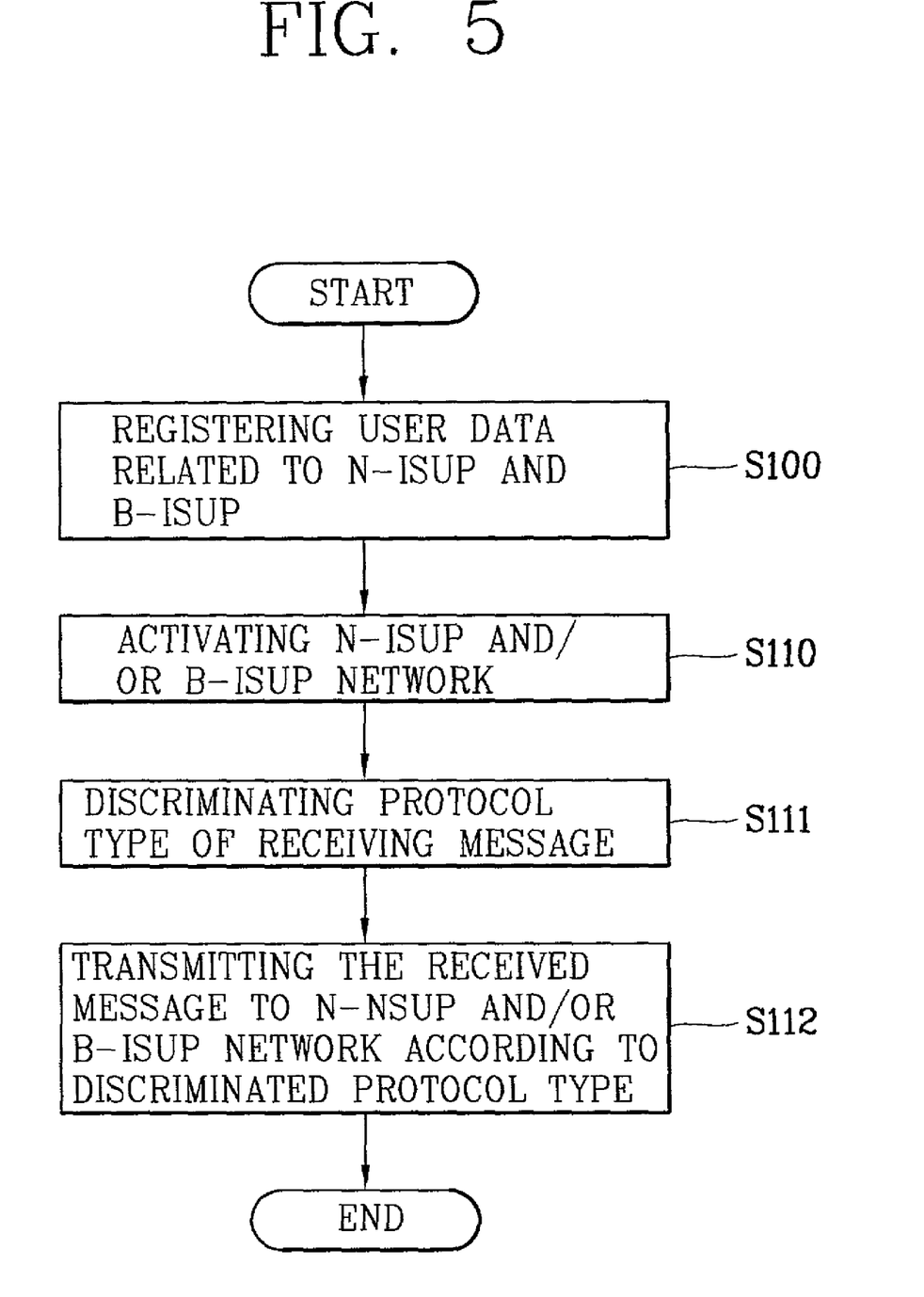
FIG. 5 is a flow chart showing the MTP L3 protocol integrating method of a telecommunications network in accordance with a preferred embodiment of the invention.

FIG. 5 is a flow chart showing the MTP L3 protocol integrating method of a telecommunications network in accordance with a preferred embodiment of the invention, and FIGS. 6A through 6E are flow charts showing processes of registering a user data, in accordance with the preferred embodiment of the invention.

As shown in step S100 of FIG. 5, a user may register user data such as the originating point code, a destination point code, a signal link, a signal link set and a signal route related to the N-ISUP network and the B-ISUP network in the data managing unit 147 through a user interface (not shown).

Figure 6A:
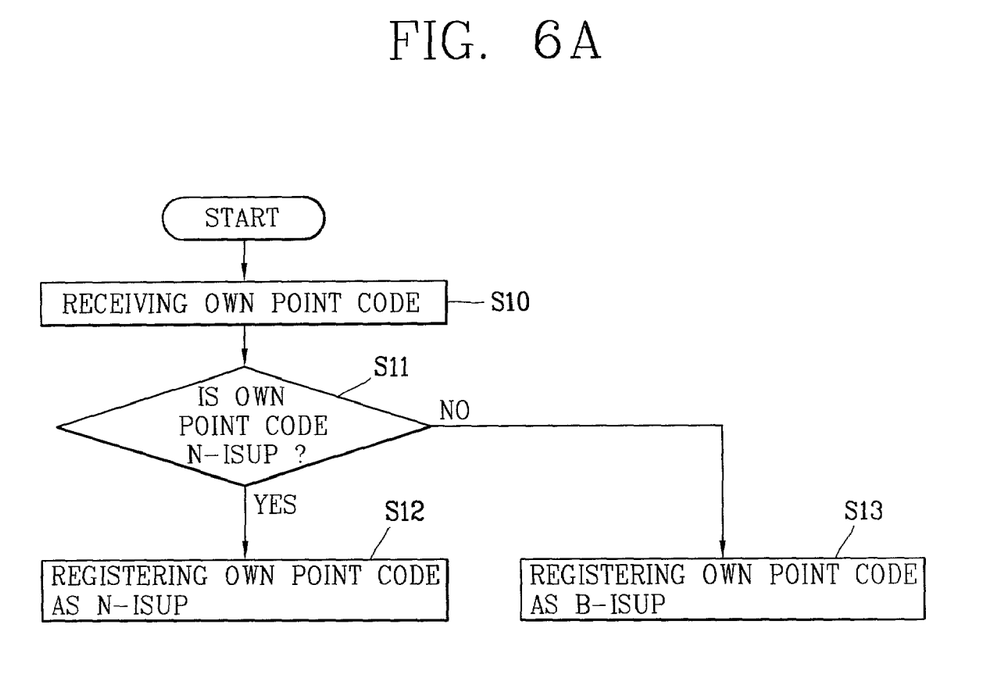
FIGS. 6A through 6E are flow charts showing processes for registering user data in accordance with a preferred embodiment of the invention.

With reference to FIG. 6A, when the originating point code is received, the data managing unit 147 may determine whether the corresponding originating point code is a signal point related to the N-ISUP network, and register the received originating point code as the N-ISUP or the B-ISUP (steps S10–S13).

Figure 6B:
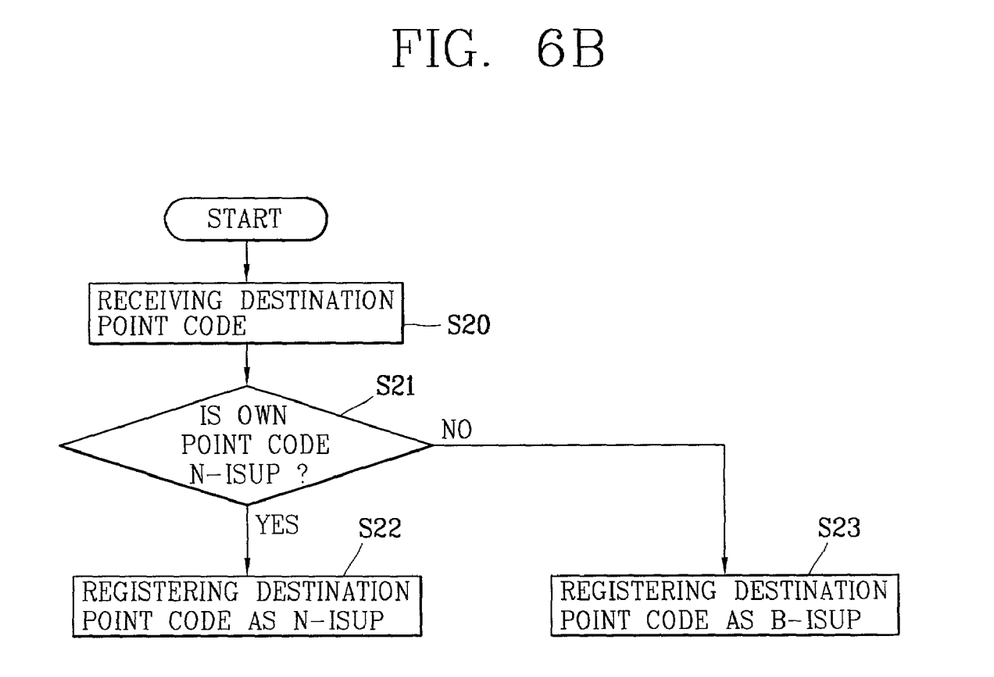

Likewise, when a destination point code is received from a user, with reference to FIG. 6B, the data managing unit 147 may determine whether the originating point code is the N-ISUP (steps S20, S21). If the originating point code is the N-ISUP, the data managing unit 147 may register the destination point code as the N-ISUP (step S22). If, however, the originating point code is the B-ISUP, the data managing unit 147 may register the destination point code as the B-ISUP (step S23).

Since the MTP L3 may not be able to receive protocols of different networks simultaneously, the originating point code and the destination point code to be connected to each other should be registered as the same type ISUP.

Figure 6C:
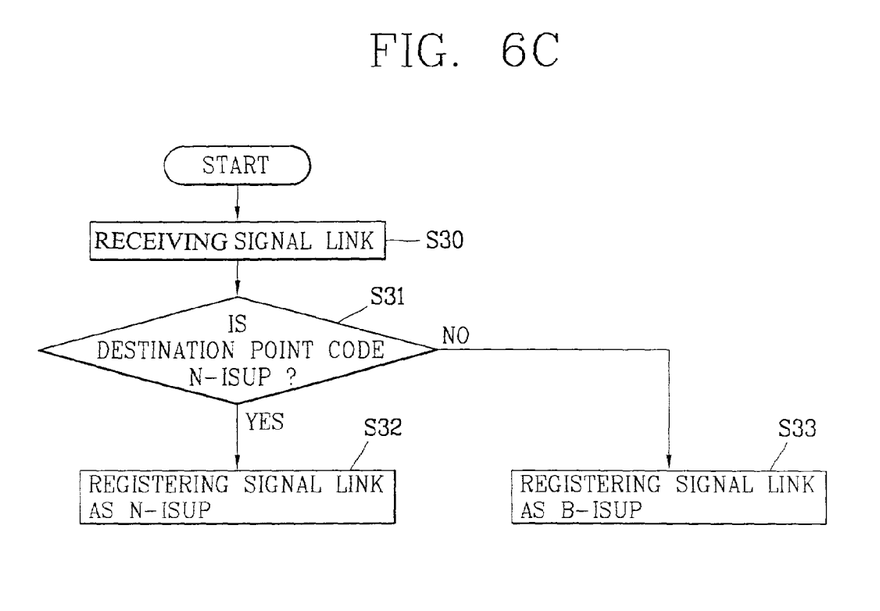

When the signal link for connecting the originating point code and the destination point code is received (step S30), with reference to FIG. 6C, and a destination point code to be connected to the originating point code has been registered, the data managing unit 147 determines whether the registered destination point code is the N-ISUP (steps S30, S31). If the registered destination point code is the N-ISUP, the data managing unit 147 may register a signal as the N-ISUP (step S32). If, however, the registered destination point code is the B-ISUP, the data managing unit 147 may register the signal as the B-ISUP (step S33).

Figure 6D:
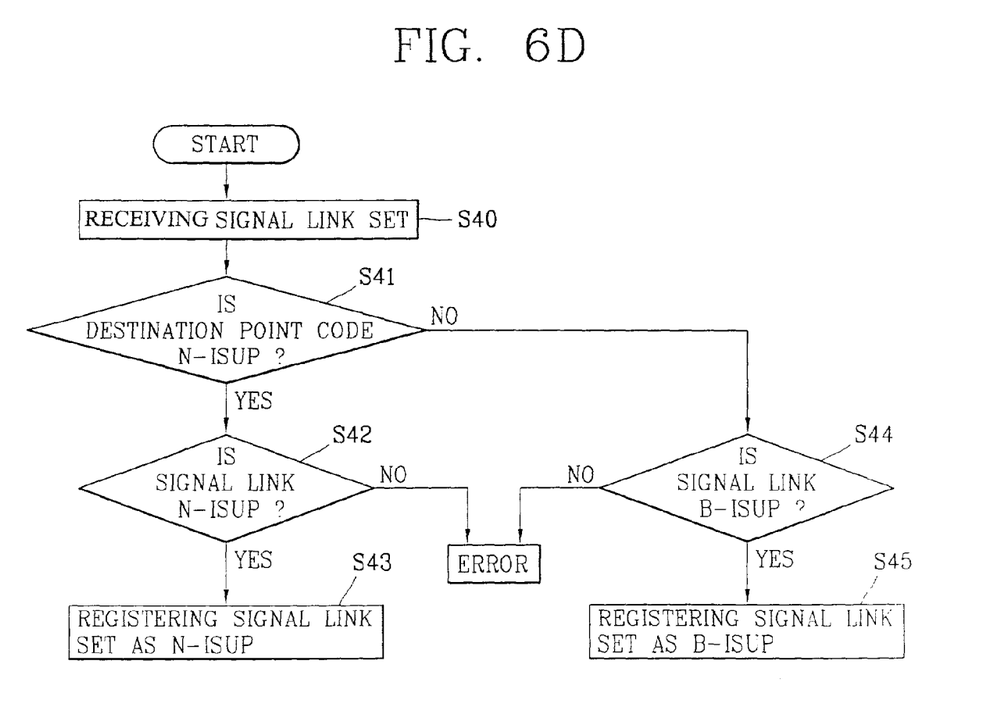

When a signal link set for connecting the originating point code and the destination point code is received (step S40), with reference to FIG. 6D, the data managing unit 147 may determine whether the previously registered destination point code is the N-ISUP (step S41). If the previously registered destination point code is the N-ISUP, the data managing unit 147 may determine whether the signal link has been registered as the N-ISUP. If the corresponding signal link has been registered as the N-ISUP, the data managing unit 147 may register the signal link set as the N-ISUP (steps S42, S43). On the other hand, if the previously registered destination point code is the B-ISUP, the data managing unit 147 may register a corresponding signal link set as the B-ISUP only where the signal link has also been registered as the B-ISUP (steps S44, S45).

Figure 6E:
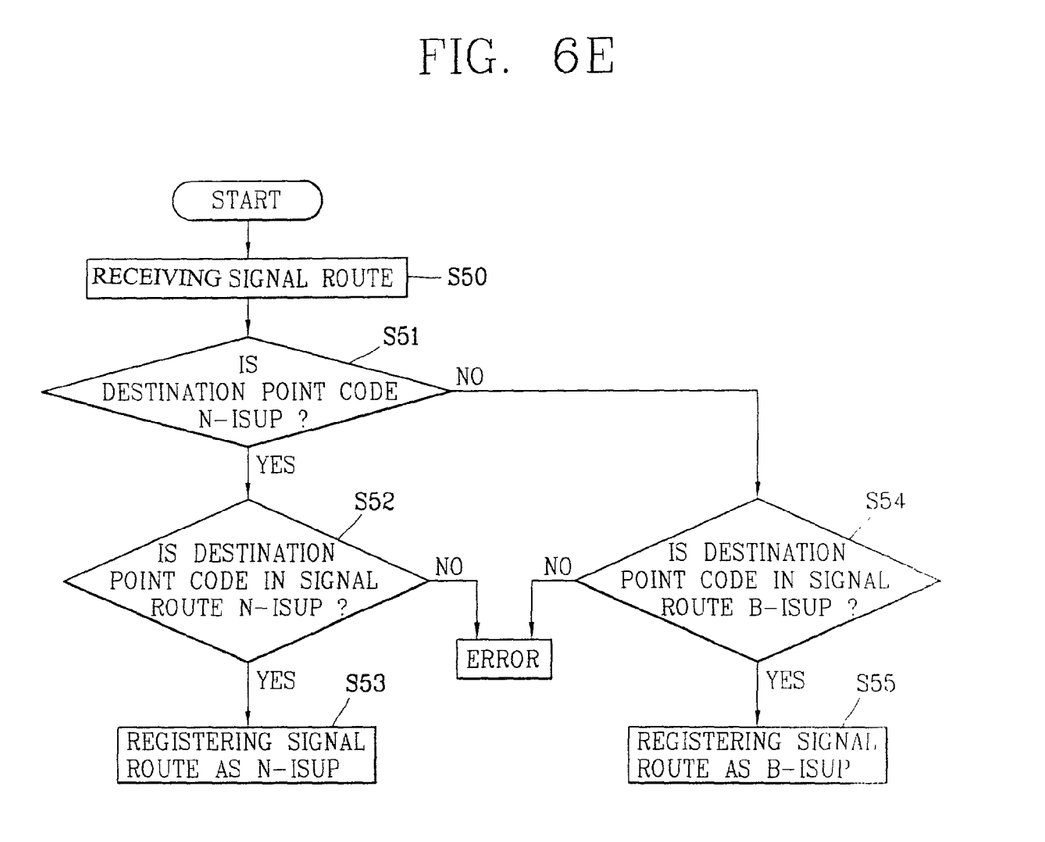

When a signal route is received from the user (step S40), with reference to FIG. 6E, the data managing unit 147 may determine whether the previously registered destination point code is the N-ISUP (step S51). If the destination point code is the N-ISUP, the data managing unit 147 may determine whether the destination point code in the signal route is the N-ISUP, and register the corresponding signal route as the N-ISUP when the corresponding destination point code is the N-ISUP (steps S42, S43). In the step S51, if the destination point code is the B-ISUP, the data managing unit 147 may register the signal route as the B-ISUP when the destination point code in the signal route is the B-ISUP.

Accordingly, the data managing unit 147 may receive the originating point code, the destination point code, the signal link, the signal link set and the signal route from the user and registers them as the N-ISUP or the B-ISUP, thereby accommodating both the B-ISUP protocol and the N-ISUP protocol.

After the originating point code, the destination point code, the signal link, the signal link set and the signal route are all registered, the user may send a control instruction to the internal managing unit 143, to activate the N-ISUP network and/or the B-ISUP network connected to the N-ISUP 150 or the B-ISUP 160 (step S110). When the control instruction is received from the user, the internal managing unit 143 may compare the originating point code and the destination point code included in the corresponding control instruction to the originating point code and the destination point code stored in the data managing unit 147 in order to determine whether the signal link desired to be currently activated by the user is the N-ISUP or the B-ISUP. If the signal link to be activated is the N-ISUP or the B-ISUP, the internal managing unit 143 may control the signal link managing unit 144, the signal link set managing unit 145 and the signal route managing unit 146, and activate the signal link, the signal link set and the signal route related to the N-ISUP network or the B-ISUP network as required. Accordingly, the MTP L3 protocol 140 may transmit and receive a message to and from the destination point code through the activated the signal link, the signal link set and the signal route of the N-ISUP or the B-ISUP.

The case that a user activates the signal link, the signal link set and the signal route of the B-ISUP is taken as an example to describe the operation of transmitting and receiving a message. When a predetermined message is received from the AAL 120, the primitive managing unit 141 may compare an originating point code and a destination point code included in the received message to an originating point code and a destination point code stored in the data managing unit 147, in order to determine a protocol type of the received message, (i.e., to determine whether the received message is the B-ISUP) (step S111). The AAL 120 may receive point code information from an ATM layer 110 and transmit it to the primitive managing unit 141.

If the received message is the B-ISUP message, the primitive managing unit 141 may search the field information of the B-ISUP message and determine whether the corresponding B-ISUP message is the originating message or the destination message. If the B-ISUP message is the originating message, the primitive managing unit 141 may output the corresponding B-ISUP message to the message distribution managing unit 142. If the B-ISUP message is the destination message, the primitive managing unit 141 may route it to a corresponding destination point.

The message distribution managing unit 142 may analyze the field information of the B-ISUP message received from the primitive managing unit 141 and determine whether the B-ISUP message is a user message or an administrative message. If the B-ISUP message is the user message, the message distribution managing unit 142 may transmit the received B-ISUP message directly to a destination signal point of the B-ISUP through the activated signal link, the signal link set and the signal route of the B-ISUP (step S112). If, however, the B-ISUP message is an administrative message, the message distribution managing unit 142 may output the received B-ISUP administrative message to the internal managing unit 143, so that the internal managing unit 143 manages and controls the state of the signal link, the signal link set and the signal route according to the administrative message.

The case that the user activates the signal link, the signal link set and the signal route of the B-ISUP is taken as an example, but the invention is not limited thereto. In a case that the user activates a signal link, a signal link set and a signal route of an N-ISUP, the same message transmitting and receiving operation may be performed.

As so far described, the MTP L3 protocol integrating apparatus and method of the present invention have many advantages. For example, the N-ISDN protocol and the B-ISDN protocol are all accommodated in a single unit and selectively operated according to a user's instruction, so that the N-ISUP network and the B-ISUP network can be simultaneously interfaced. In addition, rather than replacing the ISDN protocol itself as in the conventional art, only the MTP L2 or AAL are replaced, so that the presently used ISDN protocol can be easily modified as the occasion demands.

The foregoing embodiments and advantages are merely exemplary and are not to be construed as limiting the present invention. The present teaching can be readily applied to other types of apparatuses. For example, although the apparatus and method described in this specification was in the context of a telecommunications network that is complaint with the signaling system No. 7 (SS7) standard, the invention may also be applicable to other telecommunications standards. In addition, although the preferred embodiment relates to N-ISUP and B-ISUP user parts, the invention may be applicable to alternative ISDN user parts. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A message transfer part (MTP) level 3 protocol integrating apparatus of a network comprising:
    a narrowband-ISDN user part (N-ISUP) network;
    a broadband-ISDN user part (B-ISUP) network; and
    a MTP level 3 protocol integrating unit receiving a predetermined message from a lower layer of protocol and determining whether the message is a N-ISUP message type or is a B-ISUP message type based on a code within the received message, the MTP level 3 protocol integrating unit simultaneously interfacing the corresponding message to either the N-ISUP network or the B-ISUP network according to the determined message type of the predetermined message, wherein the MTP level 3 protocol integrating unit is capable of interfacing an N-ISUP message to the N-ISUP network and interfacing a B-ISUP message to the B-ISUP network.

2. An apparatus of claim 1, wherein the protocol integrating unit comprises:
    a data managing unit storing user data related to the N-ISUP network and the B-ISUP network;
    a signal link managing unit managing signal links of the N-ISUP network and the B-ISUP network;
    a signal link set managing unit managing signal link sets of the N-ISUP network and the B-ISUP network;
    a signal route managing unit managing signal routes of the N-ISUP network and the B-ISUP network;
    an internal managing unit controlling the signal link managing unit, the signal link set managing unit and the signal route managing unit and activating the N-ISUP network or the B-ISUP network;

a primitive managing unit for determining whether a received message is the N-ISUP message type or the B-ISUP message type; and a message distribution managing unit transmitting an originating N-ISUP message or an originated B-ISUP message from the primitive managing unit through the activated N-ISUP network or the activated B-ISUP network to an ISDN user part based on the determined message type.

3. The apparatus of claim 2, wherein the primitive managing unit compares an originating signal point code and a destination point code included in the received message to an originated signal point code and a destination point code stored in the data managing unit in order to determine the message type.

4. The apparatus of claim 2, wherein the user data refers to an originating point code, a destination point code, a signal link, a signal link set and a signal route related to the N-ISUP network and the B-ISUP network.

5. A message transfer part level 3 L3 protocol integrating apparatus of a network comprising:

a data managing unit storing user data related to a N-ISUP network and a B-ISUP network;

a signal link managing unit managing signal links of the N-ISUP network and the B-ISUP network;

a signal link set managing unit managing signal link sets of the N-ISUP network and the B-ISUP network;

a signal route managing unit managing signal routes of the N-ISUP network and the B-ISUP network;

an internal managing unit controlling the signal link managing unit, the signal link set managing unit and the signal route managing unit and activating the N-ISUP network or the B-ISUP network;

a primitive managing unit for determining whether a received message is an N-ISUP message type or a B-ISUP message type; and a message distribution managing unit transmitting an originating N-ISUP message from the primitive managing unit through the activated N-ISUP network to an ISDN user part based on the determined message type and the message distribution managing unit transmitting an originating B-ISUP message from the primitive managing unit through the activated B-ISUP network to the ISDN user part based on the determined message type.

6. The apparatus of claim 5, wherein the user data refers to an originating point code, a destination point code, a signal link, a signal link set and a signal route related to the N-ISUP network and the B-ISUP network.

7. A message transfer part level 3 protocol integrating method of a network comprising:

registering a user data related to a N-ISUP message or a B-ISUP message;

activating the N-ISUP network or the B-ISUP network according to a user control instruction and the registered user data;

determining that a received message is a N-ISUP message type based on a code within the received message and determining that another received message is a B-ISUP message type based on the code within the another received message;

transmitting a N-ISUP message through the activated N-ISUP network to the ISDN user part based on the determined message type; and transmitting a B-ISUP message through the activated B-ISUP network to the ISDN user part based on the determined message type.

8. The method of claim 7, wherein the user data refers to an originating point code, a destination point code, a signal link, a signal link set and a signal route related to the N-ISUP network and the B-ISUP network.

9. The method of claim 7, wherein, in the user data registering, the originating point code and the destination point code to be connected to each other are registered as the same type of ISUP.

10. The method of claim 7, wherein, in the user data registering, if the destination signal point is N-ISUP the signal link is registered as N-ISUP, and if the destination signal point is B-ISUP the signal link is registered as N-ISUP.

11. The method of claim 7, wherein, in the user data registering, if the destination point code and the signal link are the N-ISUP the signal link set is registered as N-ISUP, and if the destination point code and the signal link are B-ISUP, the signal link set is registered as B-ISUP.

12. The method of claim 7, wherein, in the user data registering, if the destination point code and the destination point code in the signal route are the N-ISUP the signal route is registered as N-ISUP, and if the destination point code and the destination point code in the signal route are B-ISUP the signal route is registered as B-ISUP.

13. The method of claim 7, wherein the type of the received message is determined by comparing the originating point code and the destination point code included in the received message to the originating point code and the destination point code of the user data.

14. A message transfer part level 3 protocol integrating method of a network comprising:

registering a user data related to a N-ISUP message and a B-ISUP message;

activating the N-ISUP network and the B-ISUP network according to a user control instruction and the registered user data;

determining that a received message is a N-ISUP message type based on a code within the received message and determining that another received message is a B-ISUP message type based on the code within the another received message; and transmitting a corresponding message through the activated N-ISUP network to the ISDN user part based on the determined message type and transmitting another corresponding message through the activated B-ISUP network to the ISDN user part based on the determined message type.

15. The method of claim 14, wherein the user data refers to an originating point code, a destination point code, a signal link, a signal link set and a signal route related to the N-ISUP network and the B-ISUP network.

16. The method of claim 14, wherein, in the user data registering, the originating point code and the destination point code to be connected to each other are registered as the same type of ISUP.

17. The method of claim 14, wherein, in the user data registering, if the destination signal point is N-ISUP the signal link is registered as N-ISUP, and if the destination signal point is B-ISUP the signal link is registered as B-ISUP.

18. The method of claim 14, wherein, in the user data registering, if the destination point code and the signal link are the N-ISUP the signal link set is registered as N-ISUP, and if the destination point code and the signal link are B-ISUP, the signal link set is registered as B-ISUP.

19. The method of claim 14, wherein, in the user data registering, if the destination point code and the destination point code in the signal route are the N-ISUP the signal route is registered as N-ISUP, and if the destination point code and the destination point code in the signal route are B-ISUP the signal route is registered as B-ISUP.

20. The method of claim 14, wherein the type of the received message is determined by comparing the originating point code and the destination point code included in the received message to the originating point code and the destination point code of the user data.

21. The method of claim 14, further comprising receiving the N-ISUP message from an MTP level 2 protocol prior to determining the type of the received message.

22. The method of claim 14, further comprising receiving the B-ISUP message from an asynchronous transfer mode adaptation layer prior to determining the type of the received message.

23. The method of claim 14, wherein transmitting comprises coupling an internal managing unit to the N-ISUP network and the B-ISUP network.

24. The apparatus of claim 1, wherein the protocol integrating unit comprises a single unit to couple to each of the N-ISUP network and the B-ISUP network.

25. The apparatus of claim 5, wherein the protocol integrating apparatus comprises a single unit.

26. The apparatus of claim 5, wherein the protocol integrating apparatus simultaneously interfaces the N-ISUP network and the B-ISUP network.

* * * * *